July 7, 1942.  F. CHANOUX  2,288,787
VENTING AND INDICATING ARRANGEMENT FOR WINE BARRELS OR THE LIKE
Filed Sept. 11, 1940
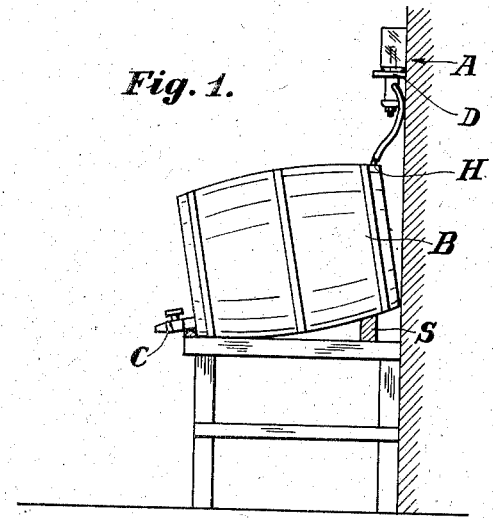
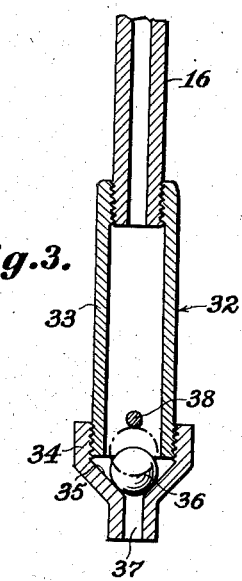
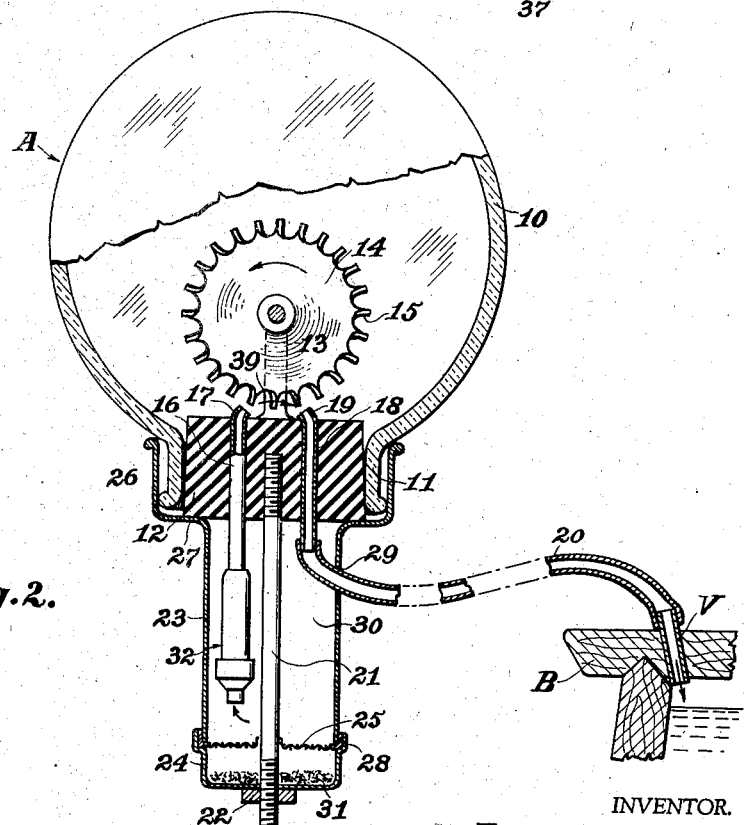
INVENTOR.
Ferdinando Chanoux.
BY
ATTORNEYS.

Patented July 7, 1942

2,288,787

UNITED STATES PATENT OFFICE 2,288,787

VENTING AND INDICATING ARRANGEMENT FOR WINE BARRELS OR THE LIKE

Ferdinando Chanoux, Woodside, N. Y.

Application September 11, 1940, Serial No. 356,334

7 Claims. (Cl. 225—20)

This invention relates generally to venting arrangements for wine barrels or the like. More particularly it relates to such a venting arrangement adapted to prevent the entrance of foreign matter into a barrel and the escape of substances therefrom and also to a venting arrangement comprising as a part thereof an indicating device to show when the venting process is taking place, and thereby to indicate that wine is being drawn from the barrel.

While my invention has been disclosed in its application to barrels for holding wine or the like, it will be understood that particularly as to certain phases thereof, it may find application to containers of other types and may also find application elsewhere than to containers.

My invention is of particular utility in the retail distribution of wine directly from the barrel. The purchaser would like to feel assured that he is getting wine from a particular barrel, in accordance with his order, and he also would like to feel assured that his wine is not contaminated.

An object of my invention is accordingly the provision in association with a barrel, such as a wine barrel, of means for indicating to a purchaser who is watching his wine being drawn, that a discharge of wine from the particular barrel selected by him is actually taking place, and further the provision in association with a barrel, such as a wine barrel, of means for indicating that wine is being drawn from a particular barrel, associated with a venting arrangement for the barrel, that is to say with an arrangement operative whenever air is admitted into the barrel for the purpose of permitting discharge of wine therefrom.

A further object of my invention is the provision in an indicating system associated with a venting system for barrels such as wine barrels, of a construction whereby freedom from contamination of the wine in the barrel is assured.

Venting arrangements for barrels (of which a hole drilled in the barrel is perhaps the simplest example) as heretofore constructed, with which I am familiar, possess the disadvantages that they permit access of air to the wine in the barrel, resulting in molding of the wine, they permit foreign matter, such as dust, to enter the barrel and contaminate the wine, and they permit the escape of volatile constituents of the wine and more particularly of those volatile constituents on which the aroma depends.

A further object of my invention is therefore the provision in a venting arrangement for wine barrels or the like of a construction whereby the air is excluded from the barrel at all times except when wine is drawn from the barrel, and whereby escape of volatile constituents from the barrel is prevented.

Among the more particular objects of my invention is also the provision in a venting arrangement for wine barrels or the like of a construction whereby no venting takes place until the pressure in the barrel drops to a predetermined amount below the external or atmospheric pressure, and whereby the venting may be caused to take place only when the amount of wine to be withdrawn is at least a glassful.

The general object of my invention is the provision in indicating and venting arrangements for wine barrels or the like of a simple, convenient effective and inexpensive construction.

These objects and such other objects as will hereinafter appear or be pointed out are attained in the illustrative embodiment of my invention shown in the drawing, in which:

Figure 1 is a side elevational view showing a wine barrel installed in the conventional manner for the retail distribution of wine and showing my invention applied to such an installation;

Figure 2 is an elevational view with portions broken away to disclose the interior construction, of one illustrative embodiment of my improved wine venting and indicating arrangement; and Figure 3 is a vertical sectional view on an enlarged scale of the air inlet valve.

In Figure 1 I have shown a wine barrel B supported in a tilted position by means of skids S and provided with a spigot C.

My improved venting and indicating arrangement is shown at A, and it will be observed that it is hung on a wall as by some suitable bracket arrangement or the like D, and is connected to the barrel B at or near the uppermost point of the barrel, such as the point designated by the letter H.

I will now describe one illustrative embodiment of my invention with the aid of Figures 3 and 2. It is to be understood that the embodiment of my invention shown in these figures is only one of the many forms in which my invention may be embodied and that I do not intend this particular embodiment to be limiting as to the details thereof.

Referring now to Figure 2, 10 therein is a container, the walls of which are shown transparent and which has a neck portion 11 closed hermetically by a stopper 12 whereby a closed chamber or compartment is formed. The stopper 12 may be of any suitable or preferred material for obtaining a hermetic closure, such as rubber, for example. It is shown as carrying a pair of uprights 13 on which is mounted for rotation a vaned wheel 14, the vanes 15 of which are adapted to receive a current of air thereon, as will be explained hereinafter, and to thereby cause rotation of the wheel 14. Such rotation of the wheel 14 may be observed through the transparent walls of the casing 10.

An inlet tube 16 is shown as passing through the stopper 12 and as having its inner or upper end portion 17 directed toward the vanes 15 of the wheel 14, and a second tube 18, serving as an outlet tube, is shown as having its end portion 19 inclined toward the lowermost vanes of the wheel 14. The tube 18 is adapted to serve as an outlet for conducting air from the chamber 10 into the barrel B. For this purpose a vent tube V may be applied to the barrel B, preferably at its uppermost point or as close thereto as is practical, and the tube V is then connected to the tube 19 by means such as a flexible rubber tube 20.

It will now be understood that the barrel B, the vent tube V, the tube 20, the tube 18, the container 10 and the tube 16 are of such character, and the joints uniting them are of such character that they constitute a unitary air-tight system closed to the external air except through the inlet valve 32 (to be described hereinafter) and the spigot C of the barrel. Whenever the spigot is opened wine will issue therefrom and the level of the wine in the barrel will sink, thereby attenuating the air and vapors in the barrel above the wine and this attenuation, with its resultant drop in pressure will be transmitted to the container 10. Whenever the drop in pressure becomes great enough to open the valve 32 on the lower end of tube 16 air will pass through the tube 16 and through container 10 into the tube 18 and into the barrel B. In its passage from tube 16 to tube 18 it rotates the wheel 14.

The stopper 12 is also shown as carrying a threaded rod 21 projecting downwardly therefrom and this rod is provided with a nut 22 adjacent its lower end whereby an assembly comprising a cup shaped member 23 a cap 24 and a dust filter 25 may be clamped in place in assembled relation to the container 10.

The member 23 is shown provided with an end portion 26 of enlarged diameter adapted to receive the neck 11 of the container 10 and provided with a shoulder 27 adapted to seat on the stopper 12.

The filter 25 is shown as in the form of a disc of foraminous material having a rim portion 28 adapted to seat over the open end of the member 23.

The cap 24 is shown as seating on the rim 28 of the filter 25 and as serving to hold the latter in place.

As already stated the nut 22 serves to hold the entire assembly 23, 24 and 25 in place. The said assembly constitutes a chamber 30 which is closed but not hermetically sealed, so that air may seep into it through the various joints and through an opening 29 through which the tube 20 is shown as passing. By so constructing the chamber 30 it will be observed that it constitutes in effect a dust proof enclosure into which sufficient air for the purpose of venting the wine barrel may enter, but into which dust will enter with difficulty. Any dust that does enter will tend to settle to the bottom of the chamber and will pass through the filter 25 and collect in the cap 24 as indicated at 31. It may be removed readily at any time simply by loosening the nut, removing and shaking the collected dust out of the cap 24.

The tube 16 carries at its lower end the inlet valve 32 which is located within the chamber 30 and therefore receives only the pure air from said chamber. The details of the construction of this valve will be found illustrated in Figure 3. The body of the valve is there shown as in the form of a vertically disposed tubular member 33 carrying a cap 34 on its lower end. This cap is provided with a seat 35 for a ball 36 which when in position on said seat closes the inlet opening 37 of the cap.

When a suction is established in the tube 16 the ball 36 rises in its seat so as to admit air through the inlet 37. The ball 36 is prevented from rising too high by a stop 38 shown by way of example as in the form of a pin passing transversely through the valve body 33.

It will be observed that the valve 32 is of the gravity type in which the ball 36 always tends, by gravity, to drop into its closed position, and the valve has only a few simple parts, for which reason it is extremely reliable in action and not apt to get out of order. It will further be observed that before the valve can open, the suction must be sufficient to overcome the weight of the ball 36. This weight may be so arranged that before the valve opens a suction corresponding to the drawing off from the barrel of at least a glass-full of wine must be created in the barrel. Making the ball of substantial weight will also have the effect of assuring more steady operation of the valve and preventing an intermittent action by chattering of the ball in its seat, which is apt to result in undesirable vibrations.

The operation of the device will now be readily understood. The bartender will take a purchaser to the barrel that the purchaser selects, and will draw off the desired quantity of wine through the spigot C. As he does so, the level of the wine in the barrel will sink and air will be drawn in through the tube 20. This, as already explained, will create a suction in the tube 19 and a lowering of the pressure in the compartment 10 which will result in air being drawn through the valve 32. The air current thus established will be strongest between the end 17 of the tube 16 and the end 19 of the tube 18, as indicated by the arrow 39, and the vanes 15 of the wheel 14 are positioned in the path of this current, as clearly appears from Figure 2. Consequently as the wine is being drawn through the spigot C the wheel 14 will rotate and the purchaser will be assured that wine is being drawn from the barrel selected by him and secondly he will be assured that air admitted into the barrel in place of the wine drawn out, which air is drawn from the container 10, is pure and uncontaminated. This is evidenced by the invisibility of the current of air in the container 10 that causes rotation of the wheel 14 as it passes from tube 16 into tube 18 and into the barrel.

While I have herein disclosed one illustrative embodiment of my invention it will again be emphasized that it may be embodied in many other forms without departing from the spirit thereof as will be obvious to those skilled in the art and it will be understood that the disclosure herein is by way of illustration merely and not to be interpreted in a limiting sense, and that I do not limit myself other than as called for by the prior art.

Having thus described my invention and illus- trated its use, what I claim as new and desire to secure by Letters Patent is:

1. For use with a wine barrel or the like, means separate from and extraneous to said barrel for venting the barrel, said means comprising a passageway leading from the external air into the upper part of the barrel, an inlet valve for permitting the passage of air into said passageway but preventing outflow therefrom positioned at the entrance to said passageway and an indicating device positioned at an intermediate point in said passageway to indicate the flow of air through said passageway into said barrel, said indicating device when in use, being intended to be positioned so as to be visible to a person standing near the barrel.

2. In a combined venting and indicator device for use with wine barrels, a closed chamber, means for admitting air into said chamber, said means having an inlet valve adapted to open to admit air into said chamber only when the pressure therein drops a predetermined amount below the external pressure, a second chamber in which said inlet valve is located, a dust collector associated with said second chamber, an outlet passage for connecting said first chamber with a wine barrel, and means positioned in said chamber in the current of air passing from said inlet valve into said outlet passage whenever the barrel is being vented and adapted to be operated thereby so as to indicate that venting is taking place.

3. In a venting arrangement for wine barrels or the like, a hermetically sealed system of passages in communication with a vent in said barrel, a relatively large chamber with transparent walls constituting a portion of said system and an inlet valve whereby air may enter said system when the pressure therein drops a predetermined amount, and an assembly constituting a substantially closed air chamber into which air may enter but into which dust can enter only with difficulty, said assembly comprising an upper container, a removable cap closing the lower end of said container, and a dust screen between said cap and said container, and said inlet valve being positioned in said container and receiving air therefrom.

4. In a venting arrangement for wine barrels or the like, a hermetically sealed system of passages in communication with a vent in said barrel, a chamber with transparent walls constituting a portion of said system and an inlet valve whereby air may enter said system when the pressure therein drops a predetermined amount, an assembly constituting a substantially closed air chamber into which air may enter but into which dust can enter only with difficulty, said assembly comprising an upper container, a removable cap closing the lower end of said container, and a dust screen between said cap and said container, and said inlet valve being positioned in said container and receiving air therefrom, and a vaned wheel in said chamber, visible through the walls thereof and adapted to be operated by a current of air passing through said chamber whenever air enters said system through said inlet valve.

5. A venting arrangement for wine barrels and the like in the form of a unitary device, comprising a relatively large chamber having transparent walls, a closed but not leakproof compartment below said chamber, a screen partitioning off the lower part of said compartment, whereby dust entering said compartment will collect below said chamber, an inlet valve in said compartment above said screen at the entrance to said passageway, said valve being adapted to open only when the pressure in said chamber drops a predetermined amount, a second passageway leading from said chamber and adapted for connection to a vent in a barrel, the openings of said passageways into said chamber being spaced from each other, whereby a current of air will pass from one to the other whenever air enters the inlet valve, and indicating means in said chamber having a portion thereof positioned in the path of said current of air and adapted to be visibly actuated thereby.

6. In a combined venting and indicator device for use with wine barrels, a closed chamber, means for admitting air into said chamber, said means having an inlet valve adapted to open to admit air into said chamber only when the pressure therein drops a predetermined amount below the external pressure, a second chamber in which said inlet valve is located, an outlet passage for connecting said first chamber with a wine barrel, and means positioned in said chamber in the current of air passing from said inlet valve into said outlet passage whenever the barrel is being vented and adapted to be operated thereby so as to indicate that venting is taking place.

7. An indicating device for indicating the discharge of liquid from a barrel or the like, said device comprising a hermetically sealed chamber having an inlet passage and an outlet passage communicating therewith, said outlet passage being in communication with the upper part of said barrel, means operating to admit air into said inlet passage only when the pressure in said chamber drops below a predetermined value, and a rotating indicator adapted to be driven by the flow of air from the inlet passage to the outlet passage whenever there is such a flow resulting from the discharge of liquid from said barrel, portions of the walls of said chamber being transparent so that the indicator is visible therethrough.

FERDINANDO CHANOUX.